United States Patent [19]

Nakagawa et al.

[11] Patent Number: 5,428,673
[45] Date of Patent: Jun. 27, 1995

[54] DATA COMMUNICATION APPARATUS HAVING THE FUNCTION OF AUTOMATICALLY SWITCHING DATA COMMUNICATION AND TELEPHONE COMMUNICATION

[75] Inventors: Kaori Nakagawa, Kawasaki; Kouichi Matsumoto, Tokyo; Toru Fujino, Urawa; Muneki Nakao, Yokohama, all of Japan

[73] Assignee: Canon Kabushiki Kaisha, Tokyo, Japan

[21] Appl. No.: 161,815

[22] Filed: Dec. 6, 1993

[30] Foreign Application Priority Data

Dec. 22, 1992 [JP] Japan ............... 4-356624

[51] Int. Cl.⁶ .......................... H04M 11/00
[52] U.S. Cl. ......................... 379/100; 379/97
[58] Field of Search ............ 379/100, 93, 96, 97, 379/98, 94; 358/400, 434, 435, 436, 437, 438, 439, 468

[56] References Cited

U.S. PATENT DOCUMENTS

| | | | |
|---|---|---|---|
| 4,800,439 | 1/1989 | Yoshino | 379/100 |
| 4,815,121 | 3/1989 | Yoshida | 379/100 |
| 4,825,461 | 4/1989 | Kurita et al. | 379/93 |
| 4,868,865 | 9/1989 | Ogawa et al. | 379/100 |
| 4,916,607 | 4/1990 | Teraichi et al. | 379/98 |
| 4,932,048 | 6/1990 | Kenmochi et al. | 379/100 |
| 5,022,072 | 6/1991 | Sakakibara et al. | 379/100 |
| 5,165,096 | 11/1992 | Matsumoto | 379/100 |
| 5,185,783 | 2/1993 | Takahashi et al. | 379/100 |
| 5,267,302 | 11/1993 | Kotani et al. | 379/94 |
| 5,280,519 | 1/1994 | Nakajim et al. | 379/94 |

Primary Examiner—Curtis Kuntz
Assistant Examiner—Jason Chan
Attorney, Agent, or Firm—Fitzpatrick, Cella, Harper & Scinto

[57] ABSTRACT

A facsimile apparatus sends a quasi-ring back tone to a destination in response to a call from the destination, and detects a CNG from the destination while the apparatus is periodically sending the quasi-ring back tone to the destination. When the apparatus detects a CNG for the first time, the apparatus stops sending the quasi-ring back tone and then performs facsimile communication in response to a second detection of a CNG from the destination, so as to certainly detect the CNG and to quickly shift to facsimile communication.

14 Claims, 11 Drawing Sheets

DATA COMMUNICATION APPARATUS HAVING THE FUNCTION OF AUTOMATICALLY SWITCHING DATA COMMUNICATION AND TELEPHONE COMMUNICATION

BACKGROUND OF THE INVENTION

1. Field of the Invention

The present invention relates to a data communication apparatus having the function of automatically switching data communication and telephone communication.

2. Related Background Art

One type of conventional facsimile apparatus that has the function of automatically switching facsimile communication and telephone communication periodically sends a quasi-ring back tone to a destination for a time t1 in response to a call from the destination. The apparatus tries to detect a CNG from the destination in a pause period in which the quasi-ring back tone is not sent. In a case where the CNG is not detected in a time t2 elapsed from closing a loop of a telephone line (t2<t1), the apparatus determines the destination to be a telephone, and performs an operator calling operation until the time t1 is over or an operator responds to the operator calling operation. At that time, the apparatus detects a CNG.

As shown in FIG. 11, in a case where the conventional facsimile apparatus does not have a filter in the CNG detecting circuit, and where sent quasi-ring back tones periodically overlap with received CNGs, the apparatus can not detect those CNGs and shift to facsimile communication.

Further, the time t1 is usually set to be about a time T1 (=35 seconds) in the recommendation T.30 of CCITT. Therefore, in a case where a CNG is not detected during the time t2, an operator sometimes cannot respond to an operator calling operation by the apparatus because the period (t1-t2) of the operator calling operation is too short (less than 35 seconds).

SUMMARY OF THE INVENTION

In consideration of the foregoing, an object of the present invention is to provide an improvement in this type of data communication apparatus.

Another object of the present invention is to provide a data communication apparatus capable of switching data communication and telephone communication smoothly and quickly.

Another object of the present invention is to provide a method which is above to switch data communication and telephone communication certainly and smoothly.

These and other objects are accomplished by providing a data communication apparatus comprising tone sending means for periodically sending a predetermined tone signal which indicates a communication line to be connected in response to a calling signal from the communication line, detecting means for detecting a first signal relating to data communication, stop means for stopping the sending operation of the predetermined tone signal by said tone sending means in response to a detection of the first signal by said detecting means, and data communication means for performing data communication in response to a further detection of the first signal after stopping the sending operation of the predetermined tone signal.

Still other objects of the present invention and the advantages thereof will become fully apparent from the following description of the preferred embodiments to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
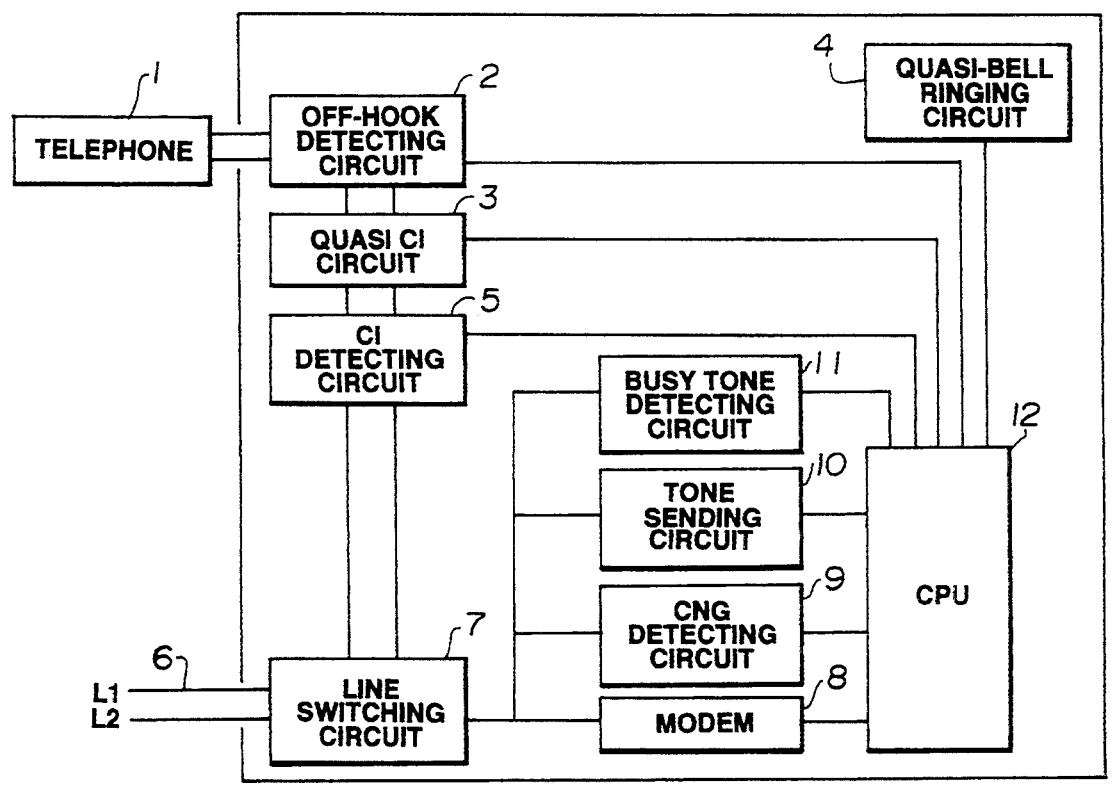
FIG. 1 is a block diagram of a facsimile apparatus according to a first embodiment of the present invention.

FIG. 1 is a block diagram showing the structure of a facsimile apparatus according to a first embodiment of the present invention.

A off-hook detecting circuit 2 is provided for detecting off-hook condition/on-hook condition of a telephone 1.

A quasi CI circuit 3 and a quasi bell ringing circuit 4 are provided for ringing a ringer when a destination is a telephone.

A CI detecting circuit 5 is provided for detecting a CI signal (calling signal) from a telephone line 6.

A line switching circuit (CML relay) 7 is provided for connecting the telephone line 6 to the telephone 1 or a modem 8.

The modem 8 is provided for modulating a transmitting signal and for demodulating a received signal.

A CNG detecting circuit 9 is provided for detecting a CNG from a facsimile apparatus of the destination.

A signal sending circuit 10 is provided for sending a tone signal, which can be a voice signal, a quasi-ring back tone etc.

A busy tone detecting circuit 11 is provided for detecting a busy tone sent from a telephone network through the telephone line 6.

A CPU 12 is provided for controlling all circuits mentioned above and the total system of this facsimile apparatus, and is structured with a microcomputer, a RAM, a ROM, and other conventional elements.

Further, this facsimile apparatus has a reader for reading an original document, a recorder for recording image data on a recording material, and an operation unit.

Figure 2:
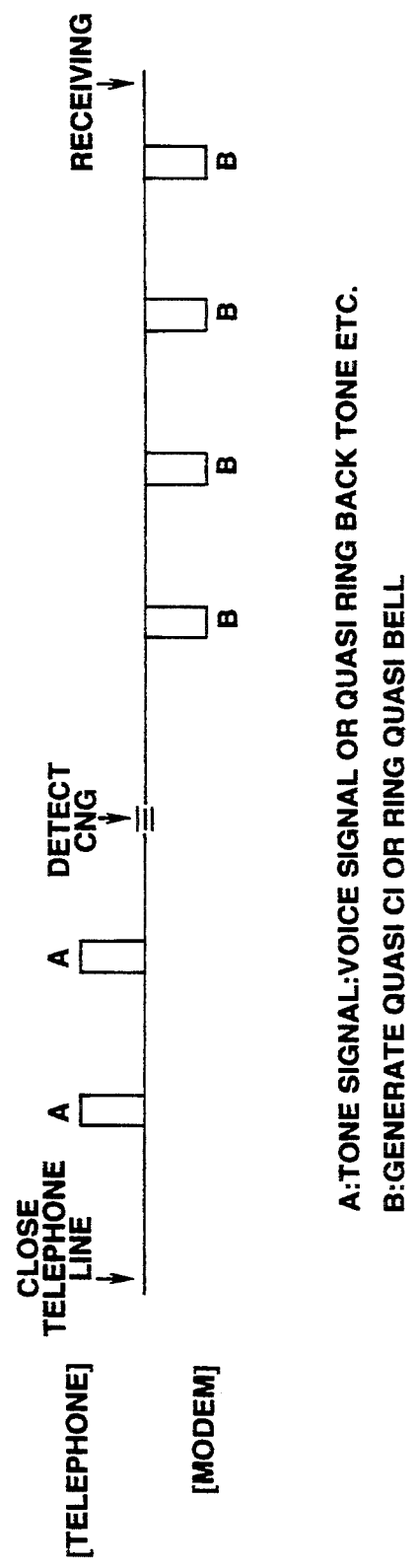
FIG. 2 is a view showing an operation sequence of the first embodiment.

FIG. 2 is a view showing an operation sequence according to this facsimile apparatus of the first embodiment.

Figure 3:
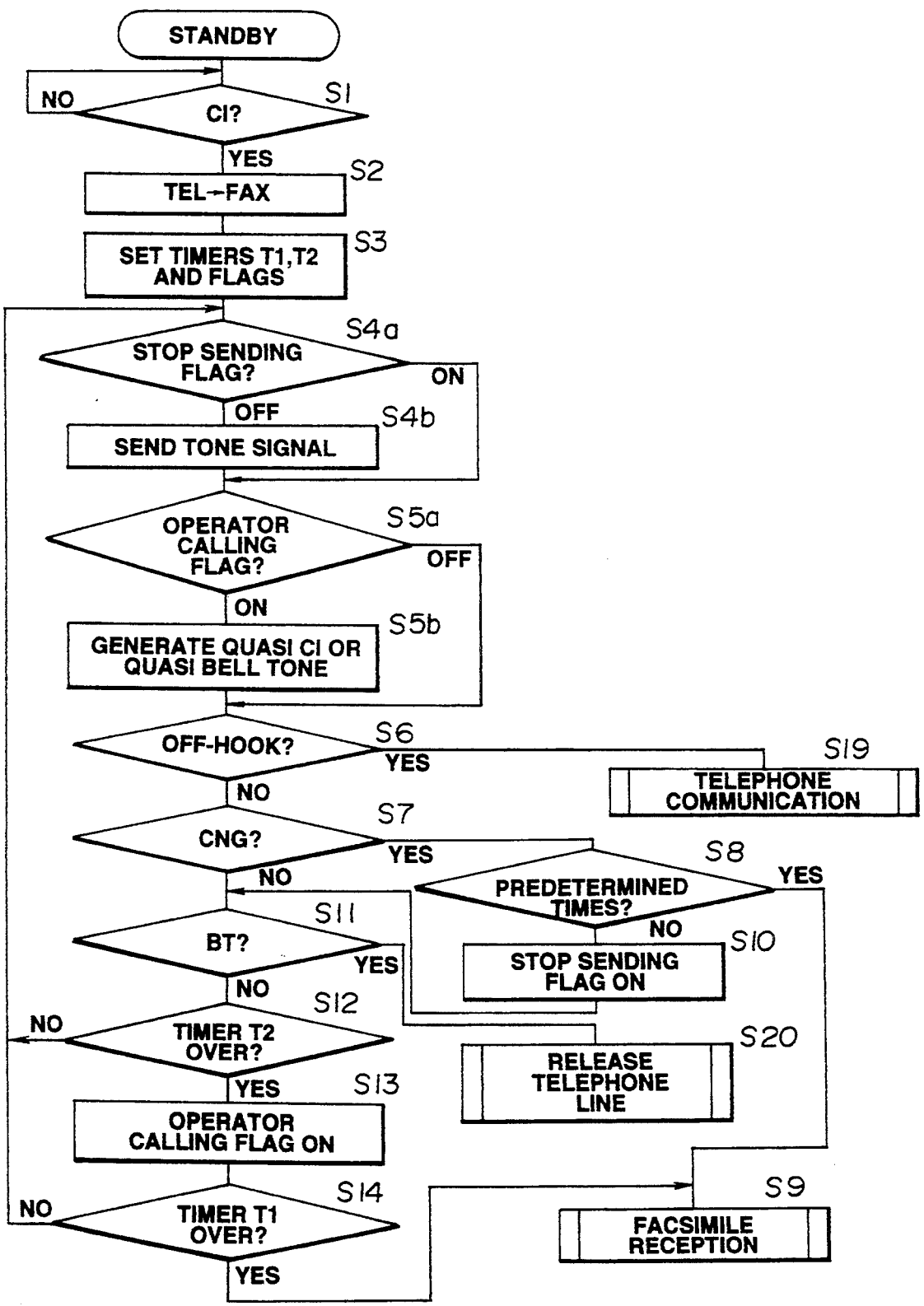
FIG. 3 is a flow chart showing a control operation of the first embodiment.

FIG. 3 is a flow chart showing a control operation by the CPU 12 when the apparatus receives a call.

The CPU 12 discriminates whether the CI detecting circuit 5 detects a CI from the telephone line 6 (S1).

If a CI is detected by the CI detecting circuit 5, the CPU 12 causes the line switching circuit 7 to connect the telephone line 6 to the modem 8 (S2), sets a timer T1 and a timer T2, and initializes flags which are used in this control operation (S3).

Next, the CPU 12 discriminates whether a stop sending flag is on or off (S4a). If the stop sending flag is off, the CPU 12 causes the tone sending circuit 10 to send a voice signal or a quasi ring back tone which indicates to a destination that the telephone line has been connected, to the telephone line 6 (S4b), and discriminates whether an operator calling flag is on or off (S5a). On the other hand, if the stop sending flag is on, the CPU 12 shifts from step S4a to step S5a. In other words, when the stop sending flag is on, the voice signal or the quasi ring back tone is not sent to the telephone line 6. If the operator calling flag is on in step S5a, the CPU 12 causes the quasi CI circuit 3 or the quasi bell ringing circuit 4 to generate a quasi CI or a quasi bell tone so as to inform of telephone communication (S5b), and discriminates whether the off-hook detecting circuit 2 detects off-hook condition of the telephone 1 (S6). If the operator calling flag is off in step S5a, the CPU 12 shifts to step S6.

If the telephone 1 is in off-hook condition in step S6, the CPU 12 causes the line switching circuit 7 to connect the apparatus for telephone communication by the telephone 1 (S19). On the other hand, if the telephone 1 is not in the off-hook condition, the CPU 12 discriminates whether the CNG detecting circuit 9 detects a CNG or not (S7). If a CNG is detected, the CPU 12 checks a number of times a CNG has been detected (S8). In a case where the number of CNG detected times is a predetermined number (more than 1), the CPU 12 determines the destination to be a facsimile apparatus and performs facsimile reception (S9). In a case where the number of CNG detected times is not the predetermined number, the CPU 12 sets the stop sending flag (S10), and shifts to step S11.

If a CNG is not detected in step S7, the CPU 12 discriminates whether the busy tone detecting circuit 11 detects a busy tone or not (S11), and when a busy tone is detected, the CPU 12 releases the telephone line 6 (S20), and then returns to the standby condition.

If the busy tone is not detected in step S11, the CPU 12 discriminates whether the timer T2 is over or not (S12), and when the timer T2 is not over, the CPU 12 shifts to step S4a. When the time T2 is over, the CPU 12 sets the operator calling flag (S13), and discriminates whether the timer T1 is over or not (S14). When the timer T1 is not over in step S14, the CPU 12 shifts to step S4a. When the timer T1 is over, the CPU 12 shifts to facsimile reception (S9), and then returns to the standby condition.

Next, a facsimile apparatus according to a second embodiment of the present invention will be described as follows.

The structure of the facsimile apparatus according to the second embodiment is similar to FIG. 1, but the CPU 12 performs a different control operation in the second embodiment.

Figure 4:
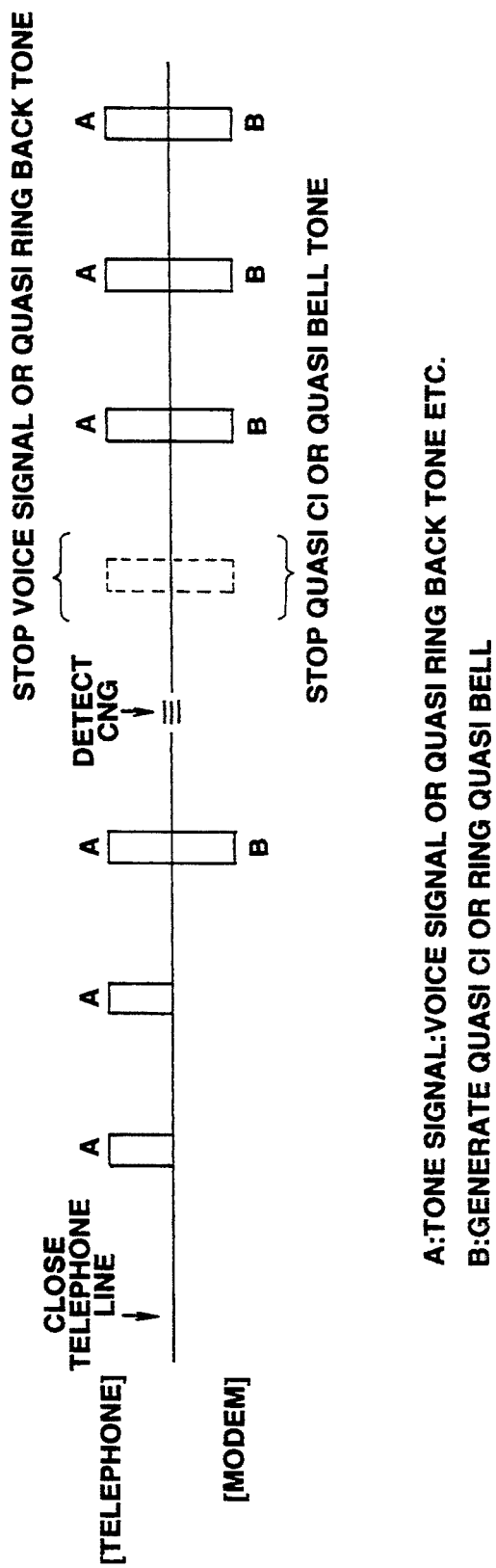
FIG. 4 is a view showing an operation sequence of a second embodiment.
Figure 5:
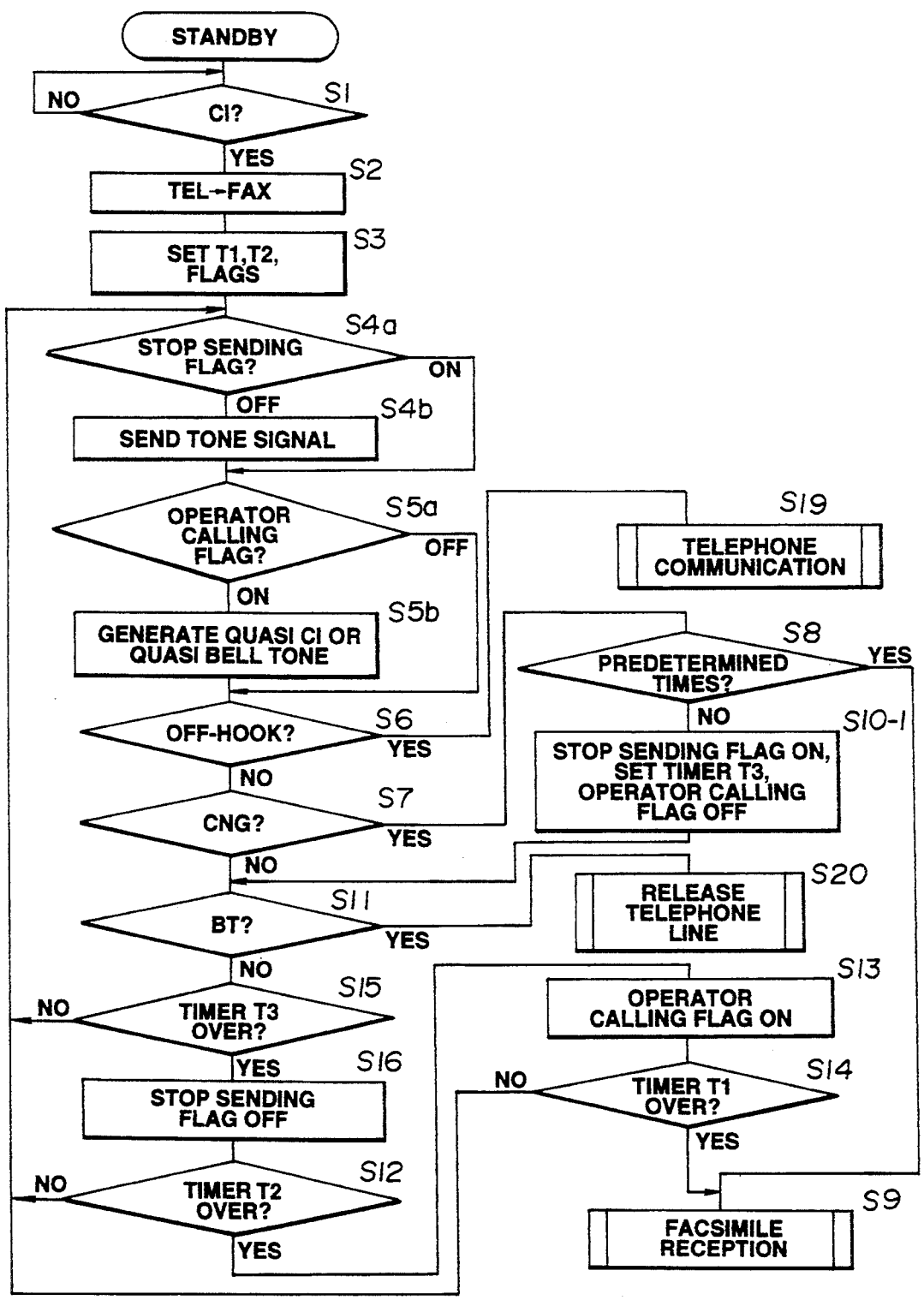
FIG. 5 is a flow chart showing a control operation of the second embodiment.

FIG. 4 is a view showing an operation sequence by the second embodiment. FIG. 5 is a flow chart showing a control operation by the CPU 12 in the second embodiment. In FIG. 5, the steps which involve the same operation as FIG. 3 are identified with the same numbers, and explanations thereof are omitted.

In the second embodiment, in a case where the number of detected times of CNG is not the predetermined number (more than 1) in step S8, the CPU 12 sets the stop sending flag ON, sets a timer T3 for tentatively suspending sending the voice signal or the quasi ring back tone, resets the operator calling flag OFF (S10-1), and shifts to step S11.

In a case where the busy tone is not detected in step S11, the CPU 12 discriminates whether the timer T3 is over or not (S15). When the timer T3 is not over, the CPU 12 shifts to step S4a. When the timer T3 is over, the CPU 12 resets the stop sending flag so as to send the voice signal or the quasi ring back tone (S16), and shifts to step S12.

Next, a facsimile apparatus according to a third embodiment of the present invention will be described as follows.

Figure 6:
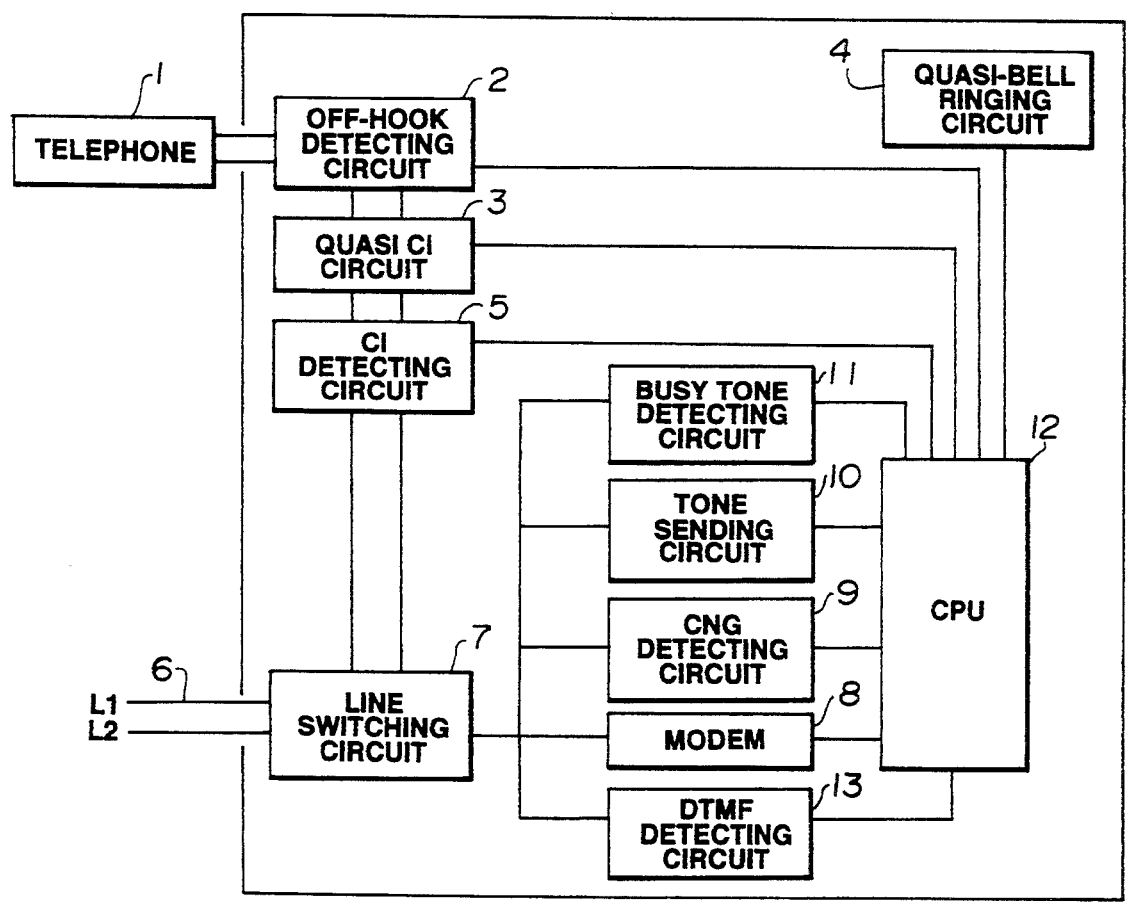
FIG. 6 is a block diagram of a facsimile apparatus according to a third embodiment.

FIG. 6 is a block diagram of the facsimile apparatus according to the third embodiment. In the facsimile apparatus of the third embodiment, further a DTMF detecting circuit 13 is provided for detecting a DTMF signal from the telephone line 6.

Figure 7:
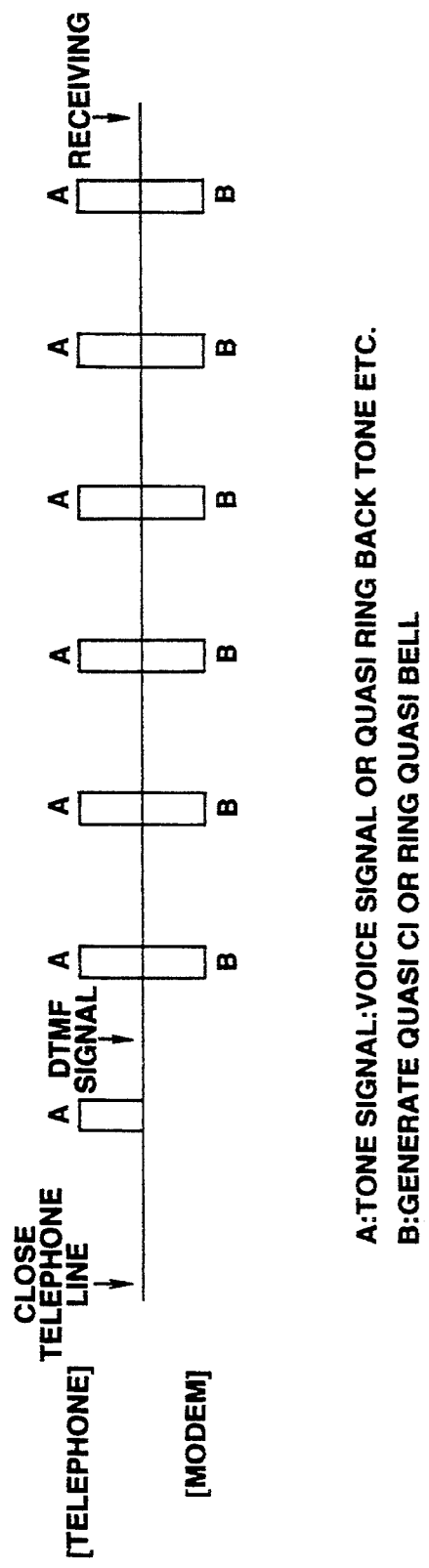
FIG. 7 is a view showing an operation sequence of the third embodiment.

FIG. 7 is a view showing an operation sequence according to the third embodiment. As shown in FIG. 7, the facsimile apparatus according to the third embodiment causes the quasi CI circuit 3 or the quasi bell ringing circuit 4 to generate a quasi CI or a quasi bell tone when the apparatus detects a predetermined DTMF signal from the telephone line 6.

Figure 8:
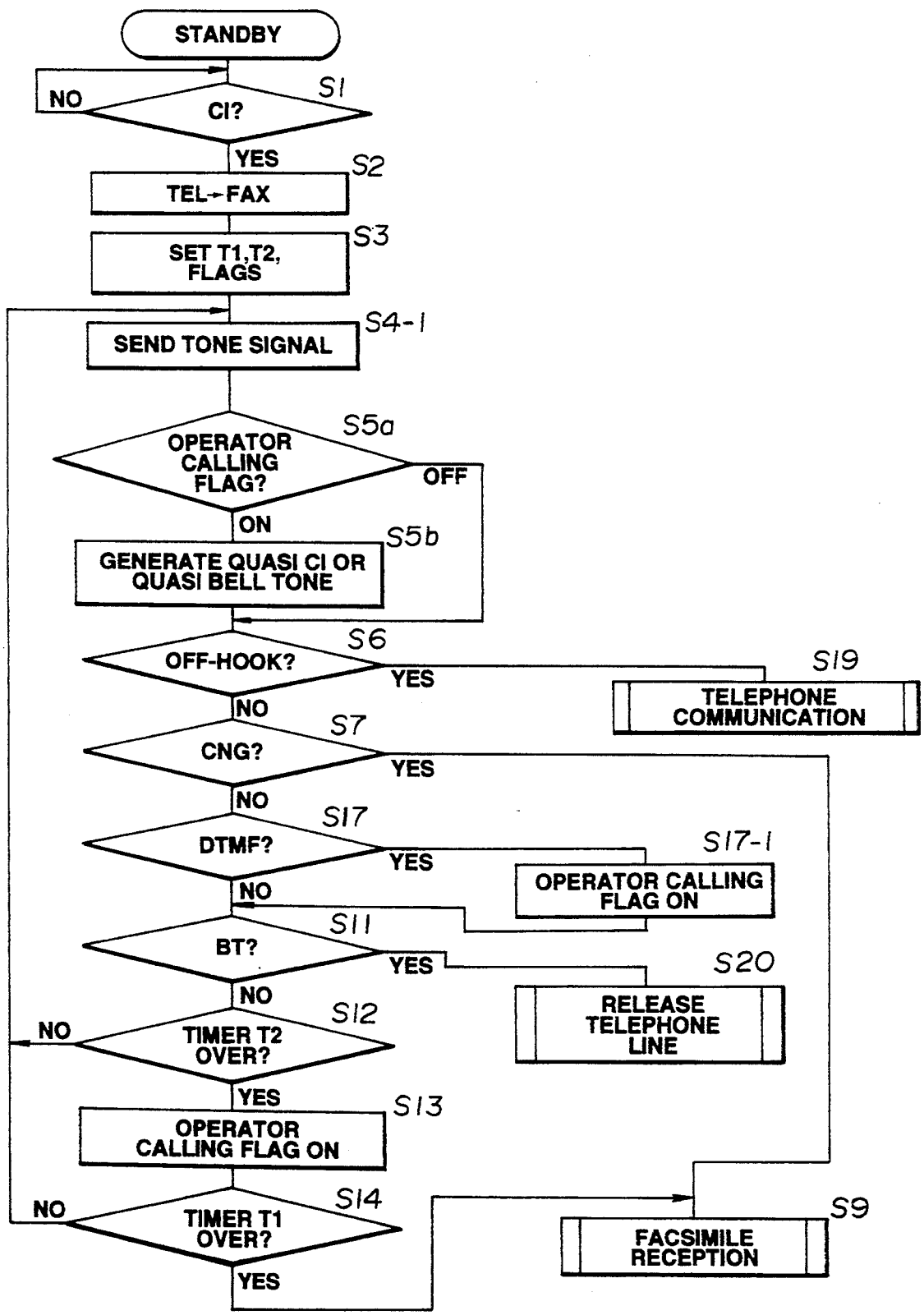
FIG. 8 is a flow chart showing a control operation of the third embodiment.

FIG. 8 is a flow chart showing a control operation by the CPU 12 in the third embodiment.

In a case where a CI signal from the telephone line 6 is detected by the CI detecting circuit 5, the CPU 12 causes the line switching circuit 7 to connect the telephone line 6 to the modem 8 (S1, S2), sets the timers T1 and T2, and initializes the flags (S3). The CPU 12 causes the tone sending circuit 10 to send a voice signal or a quasi ring back tone to the telephone line 6 (S4-1), and discriminates whether the operator calling flag is on or off (S5a). When the operator calling flag is on, the CPU 12 causes the quasi CI circuit 3 or the quasi bell ringing circuit 4 to generate a quasi CI or a quasi bell tone so as to inform an operator of telephone communication (S5b), and discriminates whether the telephone 1 is in off-hook condition or not (S6). When the operator calling flag is off, the CPU 12 shifts from step S5a to step S6.

If the telephone 1 is in the off-hook condition in step S6, the CPU 12 causes the line switching circuit 7 to connect the telephone line 6 to the telephone 1, and shifts to telephone communication (S19). If the telephone 1 is not in the off-hook condition, the CPU 12 discriminates whether a CNG is detected by the CNG detecting circuit 5 or not (S7). If a CNG is detected, the CUP 12 shifts to facsimile communication (S9). If a CNG is not detected, the CPU 12 discriminates whether the predetermined DTMF signal is detected by the DTMF detecting circuit 13 or not (S17). If the predetermined DTMF signal is detected, the CPU 12 sets the operator calling flag (S17-1), and discriminates whether a busy tone is detected by the busy tone detecting circuit 11 or not (S11). If a busy tone is detected, the CPU 12 releases the telephone line 6 (S20), and returns to the standby condition. If a busy tone is not detected, the CPU 12 discriminates whether the timer T2 is over or not (S12). If the timer T2 is not over, the CPU 12 shifts to step S4-1. If the timer T2 is over, the CPU 12 sets the operator calling flag (S13), and checks whether the timer T1 is over or not (S14). If the timer T1 is not over, the CPU 12 shifts to step S4-1. If the timer T1 is over, the CPU 12 shifts to facsimile communication (S9), and then returns to the standby condition.

Next, a facsimile apparatus according to a fourth embodiment of the present invention will be described as follows.

The structure of the facsimile apparatus according to the fourth embodiment is similar to FIG. 6, but the CPU 12 performs a different control operation in the fourth embodiment.

Figure 9:
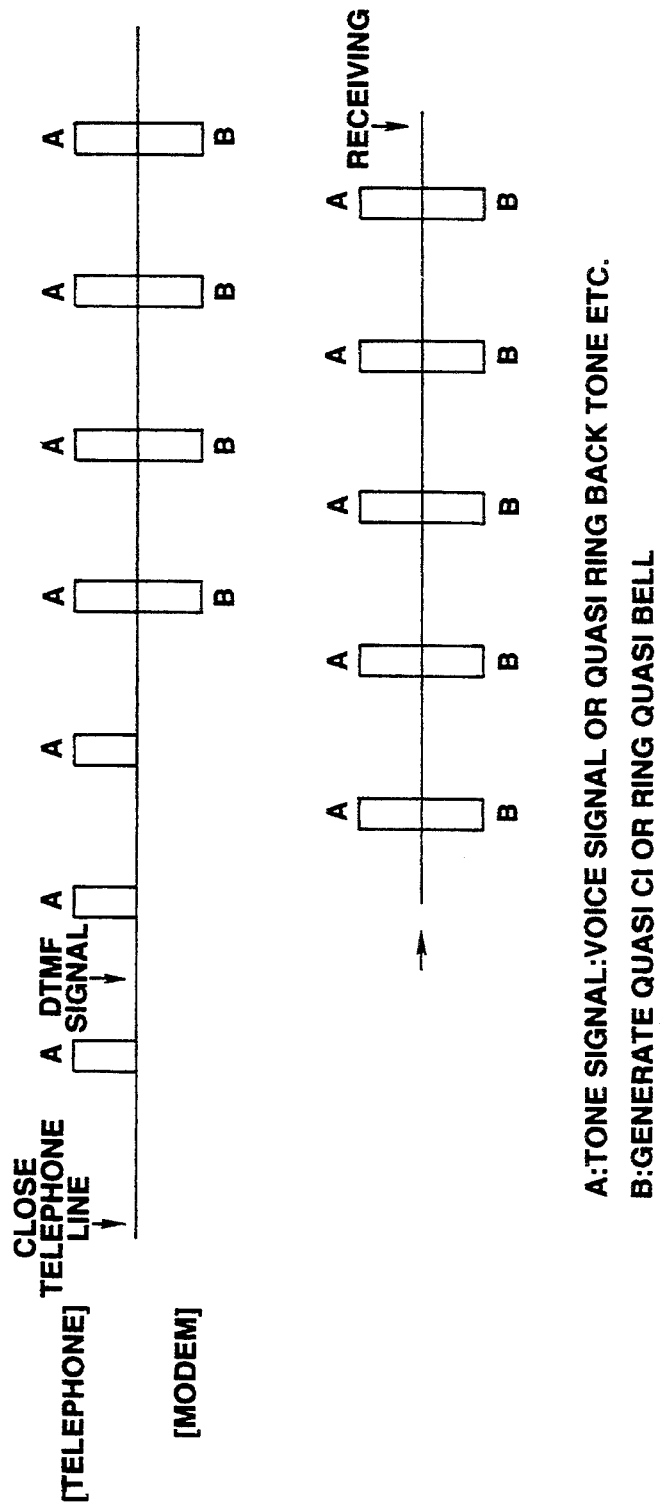
FIG. 9 is a view showing an operation sequence of a fourth embodiment.

FIG. 9 is a view showing an operation sequence according to the fourth embodiment. In the fourth embodiment, when the facsimile apparatus detects the predetermined DTMF signal, the apparatus prolongs a period of performing an operator calling operation (ringing the telephone 1 by generating a quasi CI, or generating a quasi bell tone).

Figure 10:
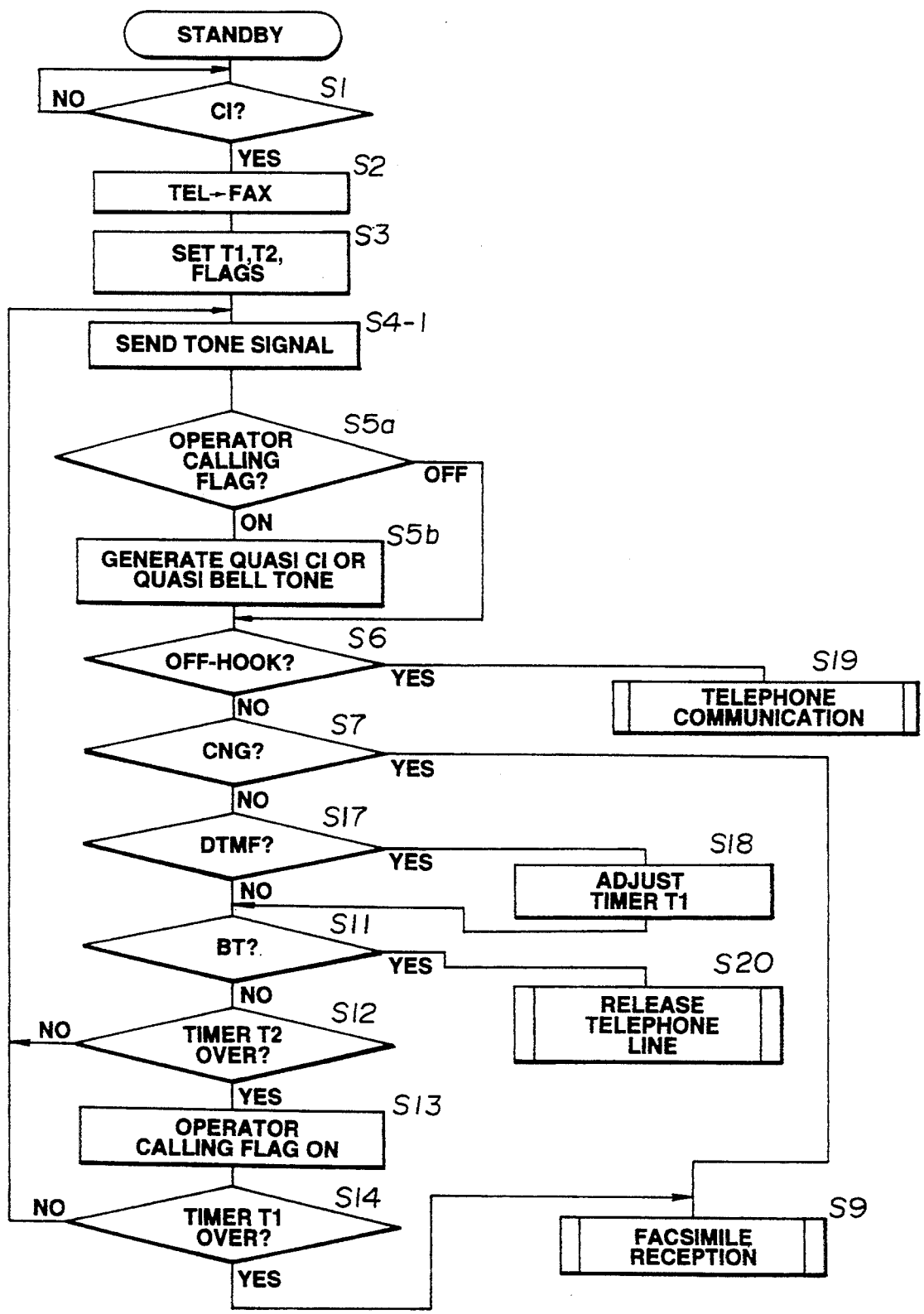
FIG. 10 is a flow chart showing a control operation of the fourth embodiment.
Figure 11:
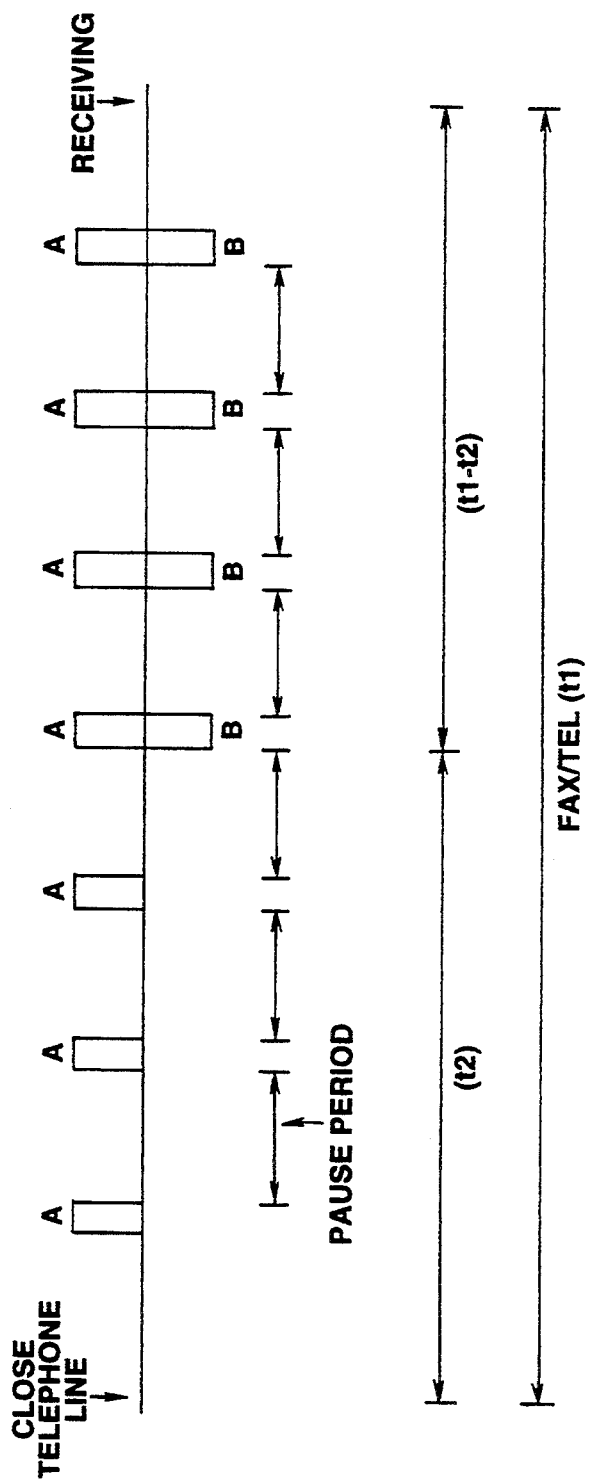
FIG. 11 is a view showing an operation sequence according to the above described prior art.

FIG. 10 is a flow chart showing a control operation by the CPU 12 in the fourth embodiment.

In the fourth embodiment, the CPU 12 performs the process of step S18 (FIG. 10) instead of the process of step S17-1 (FIG. 8).

In step S18 (FIG. 10), the CPU 12 adjusts a timer value of the timer T1 so as to prolong a period of the operator calling operation.

As described above, the facsimile apparatus according to the first embodiment or the second embodiment with certainty detects a CNG in the process of automatically switching facsimile communication and telephone communication.

Further, the facsimile apparatus according to the third embodiment quickly shifts the operator calling operation for informing an operator of telephone communication in response to the predetermined DTMF signal which indicates that a calling station (destination) requires telephone communication.

Further, the facsimile apparatus according to the fourth embodiment prolongs the period of performing the operator calling operation in response to the predetermined DTMF signal so that an operator can certainly respond to the operator calling operation.

Further, the present invention is applicable to a data communication apparatus which has the function of automatically switching data communication and telephone communication.

Although particular embodiments of the present invention are herein disclosed for purposes of explanation, various modifications thereof, after study of this specification, will be apparent to those skilled in the art to which the invention pertains.

What is claimed is:

1. A data communication method comprising the steps of:
   sending a predetermined tone signal periodically in response to a calling signal from a communication line;
   detecting a predetermined signal relating to data communication;
   stopping sending the predetermined tone signal in response to a detection of the predetermined signal;
   performing data communication in response to a further detection of the predetermined signal after stopping sending of the predetermined tone signal;
   performing an operator calling operation for informing an operator of telephone communication; and
   stopping the operator calling operation in response to a detection of the predetermined signal.

2. A data communication method according to claim 1, further comprising the steps of:
   monitoring whether a signal indicating a connecting state of the communication line while periodically sending the predetermined tone signal, and
   immediately releasing the communication line in accordance with a detection of the signal indicating the connecting state.

3. A data communication apparatus comprising:
   tone sending means for periodically sending a predetermined tone signal in response to a calling signal from a communication line;
   detecting means for detecting a predetermined signal which indicates data communication;
   stop means for stopping sending of the predetermined tone signal by said tone sending means in response to a detection by said detecting means;
   data communication means for performing data communication in response to another detection by said detecting means after stopping sending the predetermined tone signal; and
   means for performing an operator calling operation which indicates telephone communication, wherein said performing means starts the operator calling operation after a predetermined time has elapsed from receiving the calling signal,
   wherein said stop means stops the operator calling operation in response to a detection by said detecting means subsequent to commencement of the operator calling operation.

4. A data communication apparatus according to claim 3, wherein said tone sending means sends a voice signal or a quasi ring back tone signal as the predetermined tone signal.

5. A data communication apparatus according to claim 3, further comprising means for detecting a signal indicating a connecting state of the communication line, and
   wherein said control means monitors whether or not the signal indicating the connecting state is detected while periodically sending the predetermined tone signal, and immediately releases the communication line in accordance with a detection of the signal indicating the connecting state.

6. A data communication apparatus for switching data communication and telephone communication, comprising:
   tone sending means for periodically sending a predetermined tone signal in response to a calling signal from a communication line;
   first detecting means for detecting a first predetermined signal relating to data communication;
   second detecting means for detecting a second predetermined signal relating to telephone communication;
   operator calling means for performing an operator calling operation for informing an operator of telephone communication;
   data communication means for performing data communication; and control means for monitoring detection of the first predetermined signal and the second predetermined signal while said tone sending means is periodically sending the predetermined tone signal, for causing said operator calling means to perform the operator calling operation in accordance with a detection of the second predetermined signal, and for causing said data communication means to perform data communication in accordance with a detection of the first predetermined signal.

7. A data communication apparatus according to claim 6, wherein said tone sending means sends a voice signal or a quasi ring back tone signal as the predetermined tone signal.

8. A data communication apparatus according to claim 6, further comprising means for detecting a signal indicating a connection state of the communication line, and wherein said control means monitors whether or not the signal indicating the connecting state is detected while periodically sending the predetermined tone signal, and immediately releases the communication line in accordance with a detection of the signal indicating the connecting state.

9. A data communication apparatus for switching data communication and telephone communication, comprising:

tone sending means for periodically sending a predetermined tone signal in response to a calling signal from a communication line;

first detecting means for detecting a first signal relating to data communication;

second detecting means for detecting a second signal relating to telephone communication;

operator calling means for performing an operator calling operation for informing an operator of telephone communication;

data communication means for performing data communication; and control means for monitoring detection of the first signal and the second signal while periodically sending the predetermined tone signal, and for causing said operator calling means to perform the operator calling operation when the first signal is not detected before a predetermined time elapses from receiving the call signal and for causing said data communication means to perform data communication in accordance with a detection of the first signal, and for changing a period of the operator calling operation by said operator calling means in accordance with a detection of the second signal.

10. A data communication apparatus according to claim 9, further comprising means for detecting a signal indicating a connecting state of the communication line, and wherein said control means monitors whether or not the signal indicating the connecting state is detected while periodically sending the predetermined tone signal, and immediately releases the communication line in accordance with a detection of the signal indicating the connecting state.

11. A switching method between data communication and telephone communication, comprising the steps of:

periodically sending a predetermined tone signal in response to a calling signal from a communication line;

monitoring detection of a first signal relating to data communication and a second signal relating to telephone communication while periodically sending the predetermined tone signal;

performing data communication in response to a detection of the first signal; and performing an operator calling operation to inform an operator of telephone communication in response to a detection of the second signal.

12. A switching method according to claim 11, further comprising the steps of:

monitoring whether a signal indicating a connecting state of the communication line while periodically sending the predetermined tone signal, and immediately releasing the communication line in accordance with a detection of the signal indicating the connecting state.

13. A switching method between data communication and telephone communication comprising the steps of:

periodically sending a predetermined tone signal in response to a calling signal from a communication line;

monitoring detection of a first signal relating to data communication and a second signal relating to telephone communication while periodically sending the predetermined tone signal;

performing data communication in response to a detection of the first signal;

performing an operator calling operation for informing an operator of telephone communication when the first signal is not detected before a predetermined time elapses from receiving the calling signal; and changing a period of the operator calling operation in response to a detection of the second signal.

14. A switching method according to claim 13, further comprising the steps of:

monitoring whether a signal indicating a connecting state of the communication line while periodically sending the predetermined tone signal, and immediately releasing the communication line in accordance with a detection of the signal indicating the connecting state.

* * * * *

UNITED STATES PATENT AND TRADEMARK OFFICE
CERTIFICATE OF CORRECTION

PATENT NO. : 5,428,673

DATED : June 27, 1995

INVENTOR : KAORI NAKAGAWA, ET AL.

It is certified that errors appear in the above-identified patent and that said Letters Patent is hereby corrected as shown below:

Title page, item
[56] References Cited

U.S. Patent Documents, "Nakajim et al." should read --Nakajima, et al.--.

COLUMN 6

Line 10, "indicating" should read --indicates--.

COLUMN 8

Line 24, "indicating" should read --indicates--; and

Line 51, "indicating" should read --indicates--.

Signed and Sealed this

Twenty-fourth Day of October, 1995

Attest:

BRUCE LEHMAN

*Attesting Officer*       *Commissioner of Patents and Trademarks*